United States Patent [19]

Nordstrom

[11] Patent Number: 4,500,381

[45] Date of Patent: Feb. 19, 1985

[54] METHOD AND APPARATUS FOR MAKING MULTIPLE PLY PAPERBOARD

[75] Inventor: Duane M. Nordstrom, Kelso, Wash.

[73] Assignee: Longview Fibre Company, Longview, Wash.

[21] Appl. No.: 486,788

[22] Filed: Apr. 20, 1983

[51] Int. Cl.[3] .......................... B31F 1/20; B32B 31/12

[52] U.S. Cl. .................................... 156/205; 156/207; 156/250; 156/256; 156/264; 156/291; 156/470; 156/512

[58] Field of Search ............... 156/205, 207, 208, 218, 156/250, 256, 264, 265, 290, 291, 356, 357, 470, 512, 516, 517, 578, 197, 210; 493/89, 332, 333, 334, 335, 336, 295, 302, 346, 381, 463; 118/313, 314, 315, 696, 697, 698, 699

[56] References Cited

U.S. PATENT DOCUMENTS

| | | | |
|---|---|---|---|
| 2,804,764 | 9/1957 | Runton | 118/313 |
| 3,660,217 | 5/1972 | Kehr et al. | 161/68 |
| 3,713,954 | 1/1973 | Clark et al. | 156/548 |
| 3,733,235 | 5/1973 | De Ligt et al. | 156/260 |
| 3,809,593 | 5/1974 | Burke et al. | 156/257 |
| 3,838,632 | 10/1974 | Miyake | 93/94 PS |
| 4,126,508 | 11/1978 | Hoelzinger | 156/512 |
| 4,134,781 | 1/1979 | Carstens et al. | 156/64 |
| 4,170,883 | 10/1979 | Varner | 68/205 R |

*Primary Examiner*—Caleb Weston

*Attorney, Agent, or Firm*—Oliver D. Olson

[57] ABSTRACT

Multiple ply corrugated or solid fibre paperboard having any desired number of plies is made by adding to the delivery end of conventional corrugator or paster apparatus, between the cut-off section and the stacker section, a glue applicator system controlled, preferably by computer program, to apply glue only to the desired areas of those outfeeding paperboard sheets which are to be bonded together to form the desired multiple ply paperboard. The glued and unglued paperboard sheets proceed to the stacker section where they are stacked one upon another. The paperboard sheets having an interface of glue are bonded together to form the multiple ply end product and the paperboard sheets having no glue interface allow subsequent separation of the plurality of multiple ply corrugated paperboard end products in the stack. Offsetter mechanism is provided to offset corresponding margins of certain plies of a group before depositing them in the stacker, to form a splice joint.

17 Claims, 10 Drawing Figures

METHOD AND APPARATUS FOR MAKING MULTIPLE PLY PAPERBOARD

BACKGROUND OF THE INVENTION

This invention relates to the production of paperboard, and more particularly to method and apparatus for making multiple ply corrugated or solid fibre paperboard.

Multiple wall corrugated paperboard has been produced heretofore by utilizing as many single facer sections, bridges and double facer glue stations in the corrugator as are required for the number of walls to be produced. Thus, double wall paperboard production has required an arrangement of two single facer sections, two bridges and two glue stations at the double facer. Similarly, triple wall paperboard has required the utilization of three single facer sections, three bridges and three glue stations at the double facer.

The foregoing procedures for producing double and triple wall corrugated paperboards requires an extremely large investment in equipment and in plant floor space to accomodate the equipment. Corrugators have not been provided heretofore with more than three single facer sections, three bridges and three glue stations at the double facer.

Exemplary of the foregoing prior art are the methods and apparatus described in U.S. Pat. Nos. 2,949,151; 3,179,023; 3,290,205; 3,492,188; and 3,977,929.

Four wall corrugated paperboard has been produced by laminating two double wall paperboards. In like manner, five wall corrugated paperboard has been produced by laminating a double wall paperboard and a triple wall papeboard; six wall paperboard has been produced by laminating two triple wall or three double wall paperboards; and so forth. This procedure requires large laminating machinery and substantial floor space. Moreover, it is a very capital and labor intensive process.

The lamination process, with its attendant costly requirements, also is employed in the production of multiple ply solid fibre paperboard from the single shet output of a paster.

SUMMARY OF THE INVENTION

This invention provides for the production of multiple ply paperboard by adding to the dilivery, or outfeed end of conventional corrugators or pasters, after the cut-off section and before the stacker section, a glue applicator system controlled to apply glue only to the desired areas of those outfeeding paperboard sheets or blanks which are to be bonded together to produce the desired multiple ply end product, and then stacking all of the outfeeding sheets in a vertical stack of desired numbers of sheets to effect the bonding together of those sheets provided with a glue interface.

It is the principal objective of this invention to provide method and apparatus for producing multiple ply paperboard of any desired number of plies simply by the addition of a controlled glue applicator system between the cut-off section and stacker section of a conventional corrugator or paster.

Another objective of this invention is to provide method and apparatus for producing multiple ply corrugated paperboards of any desired number of plies by adding a controlled glue applicator system between the cut-off section and stacker section of a conventional corrugator equipped to produce single wall corrugated paperboard.

Another objective of this invention is the provision of method and apparatus for producing multiple ply corrugated paperboard of any desired number of plies by adding a controlled glue applicator system between the cut-off section and stacker section of a conventional corrugator equipped to produce double wall corrugated paperboard.

Still another objective of this invention is the provision of method and apparatus for producing multiple ply corrugated paperboard of any desired number of plies by adding a controlled glue applicator system between the cut-off section and stacker section of a conventional corrugator equipped to produce triple wall corrugated paperboard.

A further objective of this invention is the provision of method and apparatus for producing multiple ply paperboard for use in the manufacture of containers, wherein selected sheets are offset automatically after gluing but before stacking, to provide a splice joint in the construction of the container.

A still further objective of this invention is the provision of method and apparatus for producing multiple ply paperboard of any desired number of plies at maximum production speed and minimum cost.

The foregoing and other objects and advantages of this invention will appear from the following detailed description, taken in connection with the accompanying drawings of the preferred embodiments.

DESCRIPTION OF THE PREFERRED EMBODIMENT

Figures 1, 4, 5, 5A, 6, 6A, 7, 8:
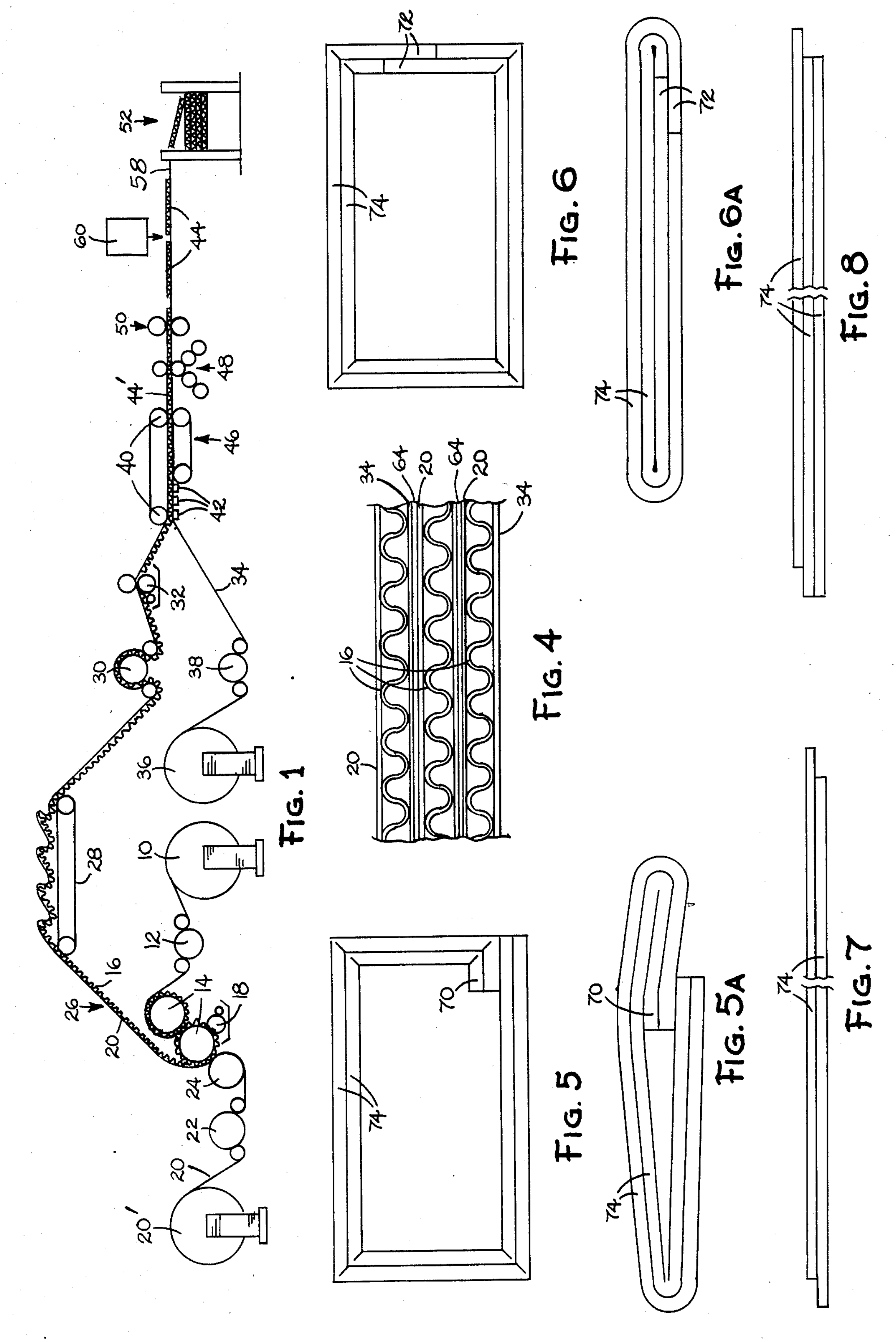
FIG. 1 is a schematic side elevation of a conventional corrugator for producing single wall corrugated paperboard and illustrating the addition thereto of a glue applicator system in accordance with the present invention.
FIG. 4 is a fragmentary side elevation showing on an enlarged scale a modified triple wall corrugated paperboard produced by the method and apparatus of this invention.
FIG. 5 is a plan view of a multiple ply corrugated paperboard box provided with the usual tab lap joint.
FIG. 5*a* illustrates the problem of such lap joints when storing the boxes in collapsed form.
FIG. 6 is a plan view of a multiple ply corrugated paperboard box provided with a splice joint.
FIG. 6*a* illustrates how this joint obviates the storage problem associated with the lap joint configuration illustrated in FIG. 5.
FIG. 7 is a foreshortened side elevation of a double ply corrugated paperboard having offset margins for producing the box illustrated in FIG. 6.
FIG. 8 is a foreshortened side elevation similar to FIG. 7 illustrating a manner of offsetting a triple ply corrugated paperboard to provide a splice joint.

FIG. 1 of the drawings illustrates schematically a conventional corrugator designed to produce single wall corrugated paperboard. The single facer section includes the supply 10 of corrugating medium, the associated pre-conditioner 12 and the corrugating rolls 14 for producing the fluted web 16. The single facer section also includes the glue applicator 18 for applying the usual starch, silicate or other appropriate adhesive to the tips of the corrugation flutes for bonding the fluted web 16 to the flat web 20 of linerboard delivered thereto from the supply 20', through the pre-heater 22 and pressure roll 24. The resulting single face material 26 is delivered to the bridge 28.

The single face board then is delivered through an additional pre-heater 30 and a glue applicator 32 where glue is applied to the exposed tips of the flutes of web 16, for subsequent bonding to the bottom, or outer facing linerboard web 34. This linerboard is delivered from its supply 36 through the pre-heater 38 to the input end of the tail pulleys 40 of the belt section and the hot plates 42 of the double facer, where the bottom facing web is bonded to the single facer board. The resulting single wall corrugated paperboard web 44 continues through the pulling section 46 of the double facer and then through the conventional slitting and scoring section 48 to the cut-off section 50 where the web is cut to appropriate sheet length for delivery to the stacker section 52.

In the conventional production of double wall corrugated paperboard, a second single facer, bridge and glue station are interposed between the illustrated single facer and input to the hot plate section of the double facer. In similar manner, conventional production of triple wall corrugated paperboard requires the addition of still a third single facer, bridge and glue station interposed between the second single facer and the hot plate section of the double facer, as will be understood.

In the production of solid fibre paperboard, the desired number of layers of containerboard are bonded together in a paster by interposed layers of glue, and then cut to appropriate sheet length at the cut-off section for delivery to the stacker section of the paster. If multiple ply structures are to be produced from these sheets, they have heretofore been processed through laminating machinery, as previously mentioned.

Figures 2, 3:
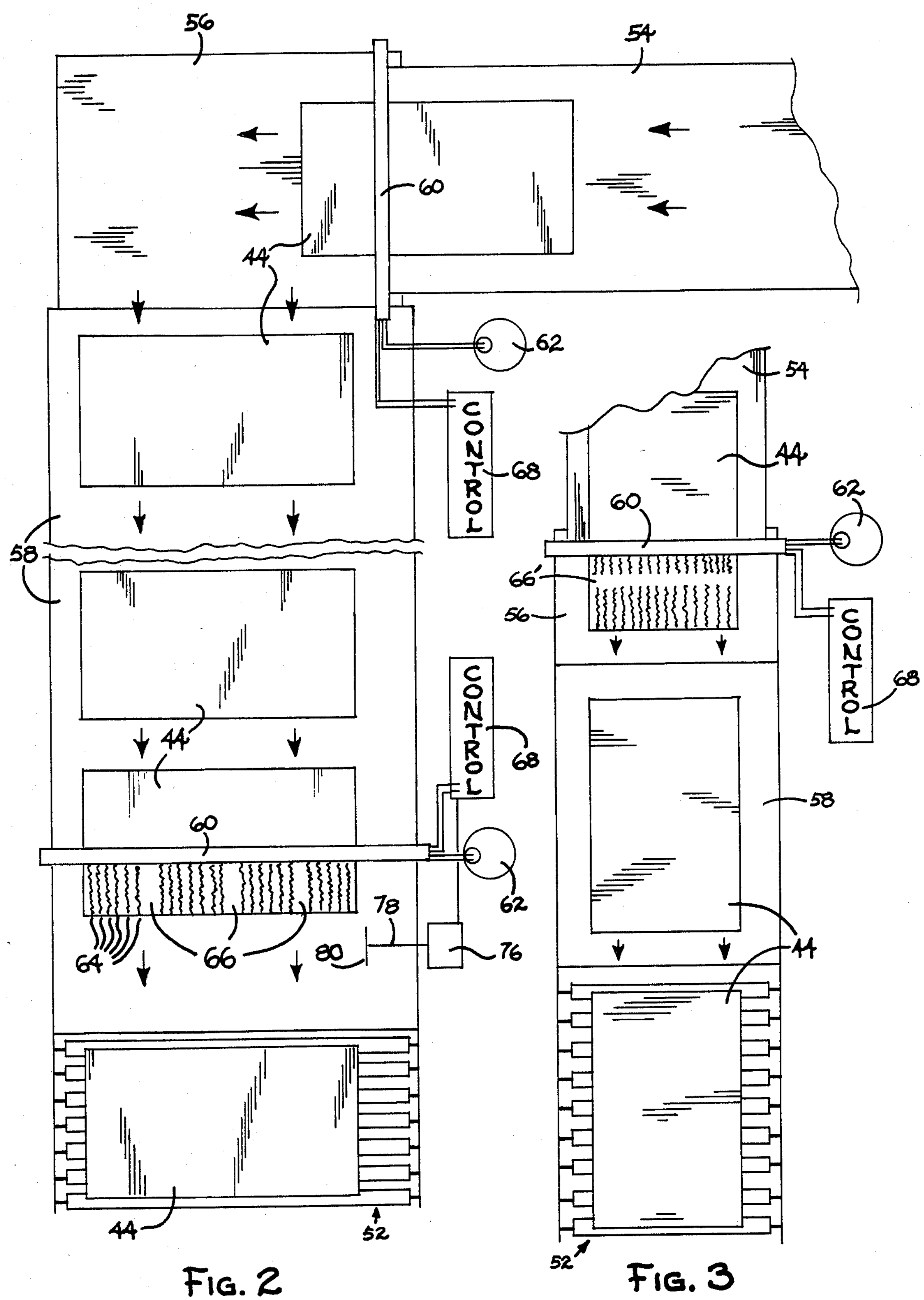
FIG. 2 is a fragmentary plan view of the delivery end of a conventional corrugator having a right angle delivery end, and illustrating alternative locations for a glue applicator system in accordance with the present invention.
FIG. 3 is a fragmentary plan view of the delivery end of a conventional corrugator having an in-line delivery end and illustrating a glue applicator system incorporated therewith in accordance with the present invention.

In either case, and referring to FIGS. 2 and 3 of the drawings, the cut sheets of corrugated or solid fibre paperboard are conveyed in longitudinally spaced apart relation on the outfeed belt conveyor 54 to the roller cage 56. In the right angle delivery end arrangement of FIG. 2, the direction of movement of the roller cage 56 is at right angles to the direction of movement of the belt conveyor 54. Accordingly, the illustrated paperboard sheets change from movement in a direction paralleling one dimension on the conveyor belt 54 to movement paralleling the direction of their other dimension on the roller cage 56.

In the case of corrugated paperboard, the direction of movement of the sheets on the conveyor 54 is perpendicular to the direction of the flutes of web 16. Accordingly, the direction of movement of the sheets on the conveyor 58 is parallel to the direction of the flutes.

The paperboard sheets proceed from the roller cage to an outfeed conveyor 58 leading to the vertical stacker section 52 where the sheets are stacked one upon another for removal as a stack for subsequent processing into containers or other products.

In the in-line delivery end type of FIG. 3, the paperboard sheets continue to the stacker section 52 without changing direction of movement.

In accordance with the present invention, production of multiple ply paperboard having any desired number of plies, is achieved simply by the addition of a glue applicator system 60 between the cut-off section 50 and the stacker section 52 of a conventional corrugator or paster. FIGS. 2 and 3 of the drawings illustrate an arrangement by which such a glue applicator system may be incorporated into the delivery end of any conventional corrugator or paster, in the outfeed belt conveyor 54 from the cut-off section adjacent the roller cage 56. This position is applicable whether the delivery end is of the right angle type of FIG. 2, or of the in-line type of FIG. 3, or of the Tee type which is analogous to the right angle type illustrated in FIG. 2. FIG. 2 also illustrated the positioning of the glue applicator system in the outfeed conveyor 58 betwen the roller cage 56 and the stacker section 52.

The glue applicator system 60 is associated with a supply 62 of glue and is provided with a multiplicity of extruder heads each of which functions to extrude a ribbon 64 of glue for deposit on the sheet. The extruder heads are controllable between open and closed positions, as by means of an electric solenoid. Thus, selected ones of the extruder heads may be closed to prevent the extrusion of glue onto certain areas of the sheet. Accordingly, glue may be omitted from those areas 66 of the sheet which are intended to be scored or slotted, as in the manufacture of containers.

For example, FIG. 2 illustrates the closing of certain ones of the extruder heads to interrupt the flow of glue to predetermined laterally spaced areas 66, while FIG. 3 illustrates the closing of all of the extruder heads simultaneously to interrupt the flow of glue to predetermined longitudinally spaced areas 66'. It will be understood that the extruder heads may be controlled to interrupt the flow of glue to both laterally spaced and longitudinally spaced predetermined areas of selected sheets, as desired.

It will also be understood that the control 68 functions in either of the locations described to close all of the extruder heads simultaneously during the intervals of time that the space between adjacent paperboard sheets is in registery with the glue applicator system 60, in order to prevent the extrusion of glue onto the conveyor supporting the paperboard sheets.

As illustrated, opening and closing of each extruder head, as by activation and deactivation of an associated electric solenoid, is operated by an electronic control 68. Although this control may be operated manually, it is preferred that it be operable automatically by a computer program. Since manually operable electronic control systems, as well as computer programmed controlled systems, are well known in the art, they are not described in detail herein.

It is to be noted that when the glue applicator system is located between the roller cage 56 and the stacker 52, with corrugated paperboard sheets 44 being moved toward the stacker, the ribbons 64 of glue are deposited on the sheets in the direction parallel to the direction of the flutes of web 16.

As previously mentioned, an alternative location for the glue applicator system 60 in the right angle delivery end of the corrugator or paster illustrated in FIG. 2, is near the inlet end of the roller cage 56. This is the same position of the glue applicator system for the in-line delivery end corrugator or paster illustrated in FIG. 3. In this position the glue applicator system functions to deposit a multiplicity of ribbons 64 of glue on sheets of corrugated paperboard which extend perpendicular to the direction of the flutes of web 16, as will be apparent.

As each paperboard sheet progresses from the glue applicator system 60, it is deposited at the stacker 52 onto the paperboard sheet immediately preceding it, in the usual manner. When a predetermined number of paperboard sheets have been stacked in this manner, the accumulated stack is removed for further processing. Means (not shown) is provided for applying pressure vertically downward on the top of the accumulated stack after it exits the stacker section, to insure proper bonding of the sheets which have a glue interface.

By virtue of the foregoing mode of operation of the conventional delivery end of a corrugator or paster, control of the glue applicator system 60 is arranged to effect the application of glue only to those paperboard sheets that are desired to be bonded together and to prevent the application of glue to those sheets which serve to separate the produced multiple ply paperboard end products from each other in the stack.

In general, for every successive group of a predetermined number of corrugated or solid fibre paperboard sheets making up a desired multiple ply paperboard, glue is applied to all but the last sheet. For example, if the end product is to be doubled ply paperboard, glue is applied to every other paperboard sheet as the sheets progress to the stacker 52. If the end product is to be triple ply paperboard, glue is applied to two successive sheets and omitted from the next sheet. In like manner, if the end product is to have ten plies, glue is applied to nine successive sheets and omitted from the tenth.

The present invention is adaptable for convenient and advantageous use with existing corrugators which are designed and operating to produce single wall, double wall or triple wall corrugated paperboard. In such instances each single facer may be provided with the same or different flute type to provide any desired multiple ply end products. As will be understood, glue is applied to those single wall, double wall or triple wall paperboard sheets exiting the cut-off section 50 which are desired to be bonded together to form the desired multiple ply end product, in the manner previously described.

It will be appreciated that the method and apparatus of the present invention functions to produce multiple ply corrugated paperboard products in which the interior surfaces consist of two facing sheets 20 and 34 bonded together by an interface layer of glue 64, as illustrated in FIG. 4. This arrangement provides additional strength to the end product, as distinguished from the single interior facing sheet produced by normal operation of conventional double and triple wall corrugators.

The method and apparatus of this invention also accommodates the automatic production of multiple ply corrugated or solid fibre paperboard sheets in which a pair or more of sheets are provided with a marginal offset for producing a splice joint in the manufacture of containers. Such a splice joint is illustrated in FIG. 6 of the drawings, and it avoids the storage problem associated with the manufacturer's joint tab 70 illustrated in FIG. 5. In this latter regard, the fully lapped arrangement of the joint tab of FIG. 5 results in an increase in the thickness of a collapsed container in the area of the joint tab, during storage and shipment, as illustrated in FIG. 5*a*. As a result, filler blocks must be inserted at intervals throughout a stack of collapsed containers, or half of the collapsed containers must be reversed in the stack, to equalize the thickness of the stack. In contrast, the splice joint 72 illustrated in FIG. 6 produces a container of uniform wall thickness. Such containers may be collapsed to uniform dimension for shipment and storage, as illustrated in FIG. 6*a*.

The container construction of FIG. 6 is produced by a double ply corrugated or solid fibre paperboard construction illustrated in FIG. 7. The two paperboard sheets 74 forming the double ply board are offset longitudinally one from the other so that their longitudinal end margins are offset from each other by an amount calculated to provide the splice joint. The offset sheets are bonded together by a glue interface, and appropriate scorings are provided at the desired areas of bend to produce the container illustrated in FIG. 6. In this regard, it will be understood that the scorings may be located to provide the splice joint at any desired location other than the mid panel arrangement illustrated in FIGS. 6. For example, the splice joint may be located adjacent a corner or bridging a corner.

The offset construction of the double ply paperboard illustrated in FIG. 7 is achieved simply and automatically by the provision of an offsetter mechanism 76 in the area of the outfeed conveyor 58 between the glue applicator system 60 and the stacker 52. In the embodiment illustrated schematically in FIG. 2, the offsetter maybe in the form of an electric solenoid which is arranged to be activated and deactivated by the control unit 68. the armature 78 of the solenoid is provided at its extended end with a pusher bar 80 arranged to engage the confronting end of the corrugated or solid fibre paperboard sheet 44 when the latter has progressed from the glue applicator system. The control unit functions to activate the offsetter to extend the pusher bar toward the left in FIG. 2 and thereby move the paperboard sheet toward the left so that the end margin of the sheet is offset in relation to the corresponding margin of the next adjacent paperboard sheet. Accordingly, when the offset sheet is deposited on the stack in the stacker, its end margin is offset to the left of the corresponding margin of the paperboard sheet which is to be bonded to it by the glue interface. This arrangement results is the double ply paperboard product illustrated in FIG. 7.

The offsetter may function with other multiple ply arrangements. For example, referring to FIG. 8, one of three plies may be offset to provide a splice joint for a triple ply paperboard product. Other multiple ply paperboard products may be offset in like manner, as will be understood.

From the foregoing it will be appreciated that the present invention provides for the production of multiply ply corrugated or solid fibre paperboard of any desired number of plies by a simple and economical addition of a controlled glue applicator system to the delivery end of any conventional corrugator or paster. Indeed, the present invention provides for the production of multiple ply corrugated paperboard of any desired number of plies by use of a conventional single wall corrugator. This avoids the extremely high costs heretofore necessitated by the requirement of a single facer section, a bridge and a double facer glue station for each wall in the production of double and triple wall corrugated paperboard. Further, the present invention avoids the additional extremely high costs of laminating machinery and plant floor space, processing time and procedures involved in laminating conventional solid fibre paperboards and single, double and triple wall corrugated paperboards in the production of multiple ply paperboards having greater than three walls in the end product.

The method and apparatus of this invention also accommodates the automatic offsetting of the sheets making up multiple ply paperboard to provide a splice joint in the manufacture of containers. This type of paperboard joint heretofore has been produced by the slow and costly manual assembly of paperboard sheets in the offset arrangement required for the splice joint.

It will be apparent to those skilled in the art that various changes may be made in the details of the process steps and in the type, number and arrangement of structural parts described hereinbefore, without departing from the spirit of this invention and the scope of the appended claims.

Having now described my invention and the manner in which it may be used, I claim:

1. A method of making multiple ply paperboard comprising applying glue to a surface of predetermined ones of paperboard sheets as they move between a cut-off section and a stacker section of paperboard making apparatus, and stacking the paperboard sheets one upon another at the stacker section and allowing the glue to bond the associated group of paperboard sheets together throughout substantially their entire areas.

2. The method of making multiple ply paperboard as defined in claim 1, wherein for every successive group of a predetermined number of said paperboard sheets, glue is applied to all but the last paperboard sheet.

3. The method of making multiple ply paperboard as defined in claim 1, wherein for every successive group of greater than three paperboard sheets the glue is applied to all but the last sheet, whereby to produce paperboard having greater than three plies.

4. The method of making multiple ply paperboard as defined in claim 1, wherein for every successive group of three paperboard sheets the glue is applied to two successive sheets and omitted from the next sheet, whereby to produce triple ply paperboard.

5. The method of making multiple ply paperboard as defined in claim 1, wherein the glue is applied to every other paperboard sheet, whereby to produce double ply paperboard.

6. The method of making multiple ply paperboard as defined in claim 1 including the step of moving less than all of the sheets of a group of associated paperboard sheets relative to the position of the remaining associated paperboard sheets before stacking, whereby upon stacking one margin of the moved sheet or sheets is off-set from the corresponding margin of the remaining sheet or sheets.

7. The method of making multiple ply paperboard as defined in claim 1 wherein the multiple ply paperboard is to be bent to form containers, the method including interrupting the application of glue at spaced areas of the paperboard sheet at which the multiple ply board is to be bent or slotted.

8. In apparatus for producing paperboard wherein paperboard sheets progress from a cut-off section to a stacker section where the paperboard sheets are stacked one upon another, the combination therewith of means for making multiple ply paperboard, comprising glue applicator means located between the cut-off section and the stacker section and arranged to apply glue to a surface of each of predetermined ones of the paperboard sheets prior to stacking, to produce successive groups of multiple ply paperboard in which the plies of each group are bonded together throughout substantially their entire areas.

9. The combination of claim 8 wherein the apparatus is arranged to produce single, double or triple wall corrugated paperboard, and the glue applicator means is arranged to apply glue to all but the last paperboard sheet of a predetermined number of said paperboard sheets in each of a succession of groups of paperboard sheets.

10. The combination of claim 8 wherein the apparatus is arranged to produce single sheet paperboard, and the glue applicator means is arranged to apply glue to all but the last paperboard sheet of a predetermined number of said sheets in each of a succession of groups of greater than three sheets in each group, whereby to produce paperboard having greater than three plies.

11. The combination of claim 8 wherein the apparatus is arranged to produce single sheet paperboard, and the glue applicator means is arranged to apply glue to two successive paperboard sheets of each successive group of three sheets and to omit the application of glue from the third sheet of each group, whereby to produce triple ply paperboard.

12. The combination of claim 8 wherein the apparatus is arranged to produce single sheet paperboard, and the glue applicator means is arranged to apply glue to every other paperboard sheet, whereby to produce double ply paperboard.

13. The combination of claim 8 including offsetter means disposed between the glue applicator means and stacker section and operable to engage and move less than all of the sheets of a group of paperboard sheets relative to the position of the unengaged remaining sheet or sheets, whereby a margin of the moved sheet or sheets is off-set from the remaining sheet or sheets of the group in the stacker section.

14. The combination of claim 8 wherein the multiple ply paperboard is to be bent to form containers, the glue applicator means being operable to interrupt the application of glue at spaced areas of the paperboard sheets at which the multiple ply paperboard is to be bent or slotted.

15. The combination of claim 8 wherein the glue applicator means is arranged to enable interruption of the application of glue to selected areas of the sheets which are spaced apart in the direction of and perpendicularly to the direction of movement of the sheets past the glue applicator means.

16. The combination of claim 8 wherein the glue applicator means is arranged to enable interruption of the application of glue to areas of the sheets which are spaced apart in the direction of movement of the sheets past the glue applicator means.

17. The combination of claim 8 wherein the glue applicator means in arranged to enable interruption of the application of glue to areas of the sheets which are spaced apart perpendicular to the direction of movement of the sheets past the glue applicator means.

* * * * *